United States Patent
Ishimoto

(10) Patent No.: US 8,801,257 B2
(45) Date of Patent: *Aug. 12, 2014

(54) EDGE LIGHT TYPE PLANAR LIGHT SOURCE DEVICE AND LIQUID CRYSTAL DISPLAY DEVICE

(75) Inventor: Yoshitake Ishimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 73 days.

This patent is subject to a terminal disclaimer.

(21) Appl. No.: 13/582,207

(22) PCT Filed: Dec. 6, 2010

(86) PCT No.: PCT/JP2010/071802
§ 371 (c)(1),
(2), (4) Date: Sep. 6, 2012

(87) PCT Pub. No.: WO2011/108165
PCT Pub. Date: Sep. 9, 2011

(65) Prior Publication Data
US 2012/0320625 A1 Dec. 20, 2012

(30) Foreign Application Priority Data
Mar. 4, 2010 (JP) .................. 2010-047811

(51) Int. Cl.
*F21V 7/04* (2006.01)
(52) U.S. Cl.
CPC .............. *G02B 6/088* (2013.01); *G02B 6/0091* (2013.01); *G02B 6/0073* (2013.01); *G02B 6/0068* (2013.01)
USPC ........... 362/602; 362/612; 362/633; 362/634; 349/58

(58) Field of Classification Search
USPC ............ 362/602, 612, 632, 633, 634; 349/58, 349/61
See application file for complete search history.

(56) References Cited

U.S. PATENT DOCUMENTS 3,910,029 A * 10/1975 Yamazaki ................. 368/84
6,175,396 B1 * 1/2001 Kim et al. ................. 349/58
(Continued)

FOREIGN PATENT DOCUMENTS

JP 06-186432 A 7/1994
JP 2002-082625 A 3/2002
(Continued)

OTHER PUBLICATIONS

Official Communication issued in International Patent Application No. PCT/JP2010/071802, mailed on Feb. 8, 2011.

*Primary Examiner* — John A Ward
(74) *Attorney, Agent, or Firm* — Keating & Bennett, LLP

(57) ABSTRACT

Provided is an edge light type planar light source device capable of preventing luminance unevenness. An edge light type planar light source device (4) includes a light guide plate (7) emitting light entering from an end face (74) from a front face, a linear light source unit (11) including LED elements (111) including light emitting surfaces (113) and an LED substrate (112) where the elements are aligned, the surfaces opposed to the end face, a floor face (91) where the plate is disposed, and a locking member (10) erecting on the floor face and inserted in a peripheral portion of the plate from a back face toward the front face, wherein some elements are disposed in a vicinity of the locking member and are disposed on the substrate such that the surfaces are inclined toward the end face to gather the light at the rear of the locking member.

5 Claims, 4 Drawing Sheets

(56) References Cited

U.S. PATENT DOCUMENTS

| | | | |
|---|---|---|---|
| 6,552,761 B1 * | 4/2003 | Seo et al. | 349/58 |
| 6,741,298 B1 * | 5/2004 | Won | 349/58 |
| 6,975,368 B2 * | 12/2005 | Lee | 349/58 |
| 7,244,966 B2 * | 7/2007 | Fukayama | 257/98 |
| 8,077,271 B2 * | 12/2011 | Yang | 349/61 |
| 8,485,677 B2 * | 7/2013 | Zhang | 362/97.1 |
| 2012/0069262 A1 * | 3/2012 | Kang et al. | 349/58 |
| 2013/0002987 A1 * | 1/2013 | Sugiura | 349/65 |

FOREIGN PATENT DOCUMENTS

| | | |
|---|---|---|
| JP | 2004-177890 A | 6/2004 |
| JP | 2005-302485 A | 10/2005 |

* cited by examiner

US 8,801,257 B2

EDGE LIGHT TYPE PLANAR LIGHT SOURCE DEVICE AND LIQUID CRYSTAL DISPLAY DEVICE

TECHNICAL FIELD

The present invention relates to an edge light type planar light source device, and a liquid crystal display device including the light source device.

BACKGROUND ART

A transmissive or transflective liquid crystal display device includes a liquid crystal display panel and a planar light source device (a so-called backlight) disposed behind the liquid crystal display panel. In this type of liquid crystal display device, planar light projected from the planar light source device is used to display an image on a display screen of the liquid crystal display panel.

An edge (side) light type planar light source device is known as the planar light source device, which has a configuration such that a linear light source, which defines a member consisting of a substrate and a plurality of LED chips that are aligned on the substrate, or a cold cathode fluorescent tube, is disposed along an end face of a light guide plate that defines a clear plate made from an acrylate resin. In this type of planar light source device, the light emitted from the linear light source is guided to the inside of the light guide plate from the end face of the light guide plate, and thereby the guided light is made into planar light and emitted from a front face of the light guide plate. The light guide plate includes scattering members in a dot pattern that are disposed over a back face of the light guide plate and arranged to scatter the light that enters from the end face of the light guide plate. In addition, a reflection sheet arranged to reflect the light is provided on the back face of the light guide plate. Thus, the light emitted from the linear light source as described above is scattered or reflected by the scattering members or the reflection sheet, and thereby the light is made into planar light and emitted from the front face of the light guide plate.

PTL 1 discloses this type of planar light source device, which includes a light guide plate on a peripheral portion of which, a notch or through hole for disposing or fixing the light guide plate to a chassis is provided. The notch or through hole is disposed inside of a peripheral end face of the light guide plate having a rectangular shape. The light guide plate is disposed or fixed to the chassis with the use of a projecting locking member such as a pin that erects from the chassis and is inserted in the notch or through hole.

Having this configuration, the light guide plate does not need a convex portion to be disposed outside of the peripheral portion as shown in PTL 2 for the purpose of disposition of the light guide plate. Thus, every end face of the light guide plate has an almost straight (almost flat) shape. The planar light source device including the light guide plate described above is capable of having the linear light source disposed along any end face of the light guide plate. In addition, the planar light source device including the light guide plate described above is preferably used together with a liquid crystal display panel having a narrow nondisplay region that surrounds a display region (i.e., a liquid crystal display panel having a narrow frame region).

CITATION LIST

Patent Literature

PTL 1: JP H06-186432
PTL 2: JP2005-302485

SUMMARY OF INVENTION

Technical Problem

However, a problem arises in PTL 1 that when the locking member such as a pin is inserted in the portion inside of the peripheral end face of the light guide plate, the locking member blocks the light projected from the linear light source to make luminance unevenness develop in the planar light source device.

A description of the luminance unevenness that develops in the planar light source device will be provided with reference to FIG. 4. FIG. 4 is a plan view showing a schematic configuration of a conventional edge light type planar light source device 4P. The conventional edge light type planar light source device 4P includes a light guide plate 7 having a rectangular shape. The light guide plate 7 includes a plurality of notches 73 that are disposed on peripheral portions on longer sides of the light guide plate 7. A plurality of locking pins (locking members) 10 are inserted in the notches 73. Linear light source units 11P are disposed on two end faces 74 (74A and 74B) on the longer sides of the light guide plate 7. Each linear light source unit 11P has a configuration of including an LED substrate, and a plurality of LED elements 111 that are aligned on the LED substrate. Each LED element 111 includes a light emitting surface 113 arrange to emit light therefrom, and the light emitting surfaces 113 are opposed to the end faces 74 of the light guide plate 7.

In the conventional edge light type planar light source device 4P shown in FIG. 4, when the light is projected onto the light guide plate 7 from the linear light source units 11P, the light projected onto the end faces 74 of the light guide plate 7 is blocked by the locking pins 10 disposed in front of the light, and thereby portions 20 are provided in the rear of (behind) the locking pins 10, the portions 20 being lower in luminance than the other portions (i.e., the portions 20 define shadows). In this case, the light emitted from a front face 71 of the light guide plate 7 decreases at the portions 20 compared with the other portions, and the portions 20 become darker. Thus, the planar light emitted from the planar light source device 4P is, as a whole, nonuniform in intensity. When the light emitted from the planar light source device 4P is nonuniform as described above, display unevenness (luminance unevenness) develops in a liquid crystal display panel, which is a problem.

PTL 1 discloses a technique of adjusting the size and the disposition of scattering members disposed on a back face of the light guide plate, and gathering the scattered light at the rear of the locking member in order to make the light emitted from the planar light source device uniform. However, it is difficult to make the rear of the locking member bright enough to remove the display unevenness (luminance unevenness) developing in the liquid crystal display panel only by adjusting the size and the disposition of the scattering members, which is a problem.

An object of the present invention is to provide an edge light type planar light source device that has a configuration that light emitted from LED elements provided on LED substrates that are opposed to end faces of a light guide plate is guided to the inside of the light guide plate and made into planar light to be emitted from a front face of the light guide plate, whereby luminance unevenness is prevented from developing, which, for example, develops when light is projected onto a back face of a liquid crystal display panel, and to provide a liquid crystal display device including the light source device and a liquid crystal display panel behind which the light source device is disposed.

Solution to Problem

An edge light type planar light source device of the present invent includes;

<1> a light guide plate arranged to emit light, which enters from an end face of the light guide plate, from a front face of the light guide plate, a linear light source unit that includes a plurality of LED elements each including light emitting surfaces from which light is emitted, and an LED substrate on which the LED elements are aligned, the light emitting surfaces being opposed to the end face of the light guide plate, a floor face, on which the light guide plate is disposed, and a locking member erecting on the floor face, that is inserted in a peripheral portion of the light guide plate from a back face of the light guide plate toward the front face of the light guide plate, wherein some of the LED elements are disposed in a vicinity of the locking member, and the some LED elements are disposed on the LED substrate such that the light emitting surfaces of the some LED elements are inclined toward the end face of the light guide plate to gather the light at the rear of the locking member.

<2> The edge light type planar light source device according to <1> preferably has a configuration such that at least two of the LED elements are disposed in the vicinity of the locking member, and the at least two LED elements are disposed on the LED substrate such that the light emitting surfaces of the at least two LED elements approach each other and are inclined toward the end face of the light guide plate.

<3> The edge light type planar light source device according to <1> or <2> preferably has a configuration such that the light guide plate includes either one of a notch and a through hole that is disposed on the peripheral portion of the light guide plate, and the locking member is inserted in the either one of the notch and the through hole.

<4> A liquid crystal display device of the present invention includes a transmissive or transflective liquid crystal display panel, and the edge light type planar light source device according to according to any one of <1> to <3>, which is disposed on a back face of the liquid crystal display panel.

<5> An edge light type planar light source device of the present invention includes a light guide plate arranged to emit light, which enters from an end face of the light guide plate, from a front face of the light guide plate, a linear light source unit that includes a plurality of LED elements each including light emitting surfaces from which light is emitted, and an LED substrate on which the LED elements are aligned, the light emitting surfaces being opposed to the end face of the light guide plate, a floor face, on which the light guide plate is disposed, and a locking member erecting on the floor face, that is inserted in a peripheral portion of the light guide plate from a back face of the light guide plate toward the front face of the light guide plate, wherein some of the LED elements are disposed in a vicinity of the locking member, and the some LED elements each include resin lenses arranged to make directivities of the some LED elements wider than directivities of the other LED elements to gather the light at the rear of the locking member.

Advantageous Effects of Invention

Because the edge light type planar light source device of the present invention has the configuration that the light from the some of the LED elements disposed in the vicinity of the locking member that erects on the floor face on which the light guide plate is disposed and is inserted in the peripheral portion of the light guide plate is gathered at the rear of the locking member, the amount of the light around the locking member does not decrease, which prevents luminance unevenness from developing in the light emitted from the front face of the light guide plate. In addition, disposing the light source device having the configuration described above behind the liquid crystal display panel allows an image formed on a screen of the liquid crystal display panel by the light that is uniformly projected onto the liquid crystal display panel.

DESCRIPTION OF EMBODIMENTS

Detailed descriptions of an edge light type planar light source device and a liquid crystal display device of preferred embodiments of the present invention will now be provided with reference to the accompanying drawings. It is to be noted that the present invention is not limited to the preferred embodiments described in the present specification.

Figure 1:
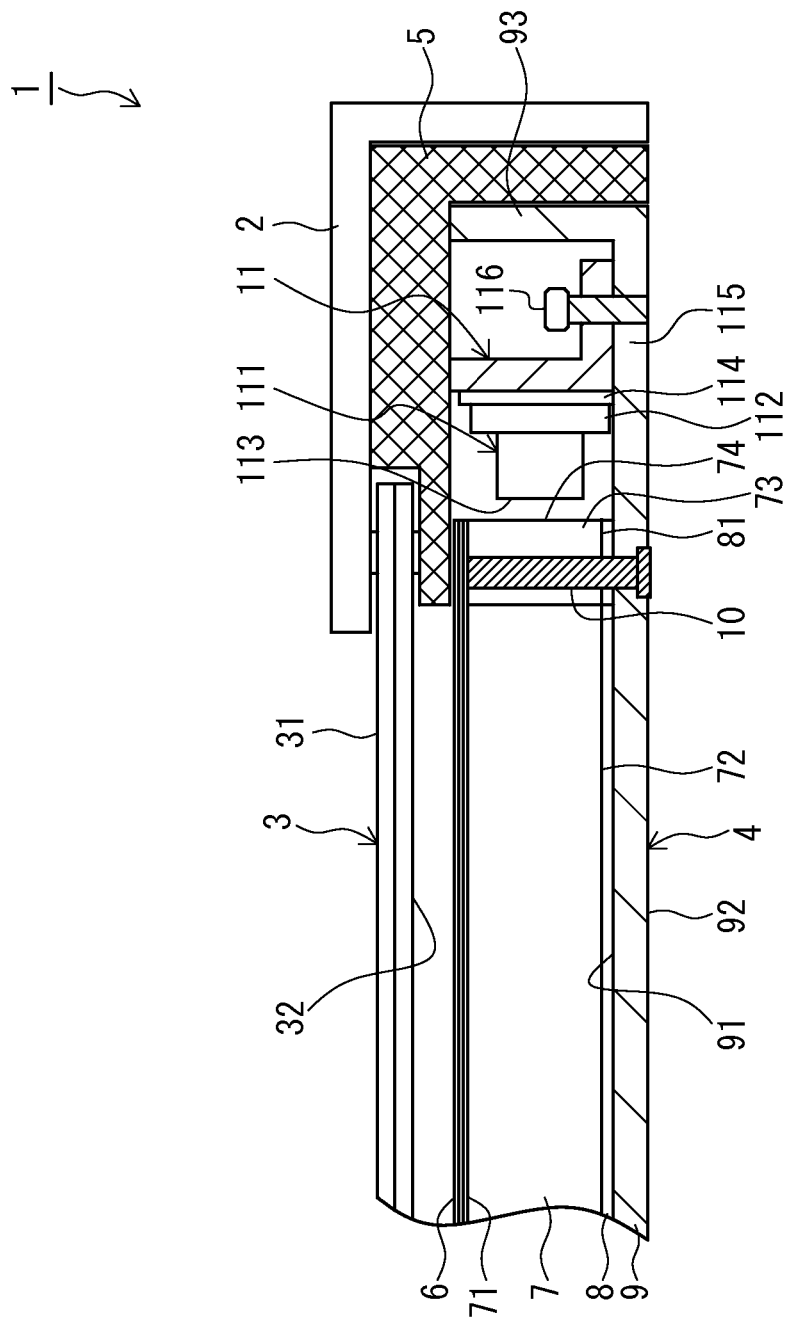
FIG. 1 is an explanatory view schematically showing a liquid crystal display device in cross section of a preferred embodiment of the present invention.

FIG. 1 is an explanatory view schematically showing a liquid crystal display device 1 in cross section of a preferred embodiment of the present invention. The liquid crystal display device 1 includes a bezel 2, a liquid crystal display panel 3, and an edge light type planar light source device 4.

The bezel 2 has a frame shape so as to be covered on a peripheral portion of the liquid crystal display panel 3. The bezel 2 is, together with a chassis 9 to be described later, arranged to ensure strength of the entire liquid crystal display device 1.

The liquid crystal display panel 3 consists of two glass substrates that are bonded together while sandwiching liquid crystals therebetween. The liquid crystal display panel 3 is disposed above the edge light type planar light source device 4, receives light projected from the light source device 4 with its back face 32 and displays an image on its front face 31 using the light. The liquid crystal display panel 3 is electrically connected to a control circuit board (not shown) the light source device 4 includes.

The edge light type planar light source device 4 includes a frame 5, optical sheets 6, a light guide plate 7, a reflection sheet 8, a chassis 9, locking pins (locking members) 10, and linear light source units 11.

The chassis 9 is preferably a metal plate made from aluminum, and takes the shape of a container of low height by bending the metal plate. The chassis 9 includes a bottom 92 on a front face (floor face) 91 of which the light guide plate 7 is disposed, and a side wall 93 that erects on the bottom 92 so as to surround the bottom 92.

The reflection sheet 8 having a rectangular shape is disposed on the floor face 91 of the chassis 9. The reflection sheet 8 defines a white expanded resin sheet (e.g., an expanded polyethylene terephthalate sheet). The reflection sheet 8 includes a plurality of notches 81 disposed on a peripheral portion of the reflection sheet 8. The light guide plate 7 is disposed on the reflection sheet 8. The positions of the notches 81 of the reflection sheet 8 are determined so as to correspond to the positions of notches 73 to be described later of the light guide plate 7.

Figure 2:
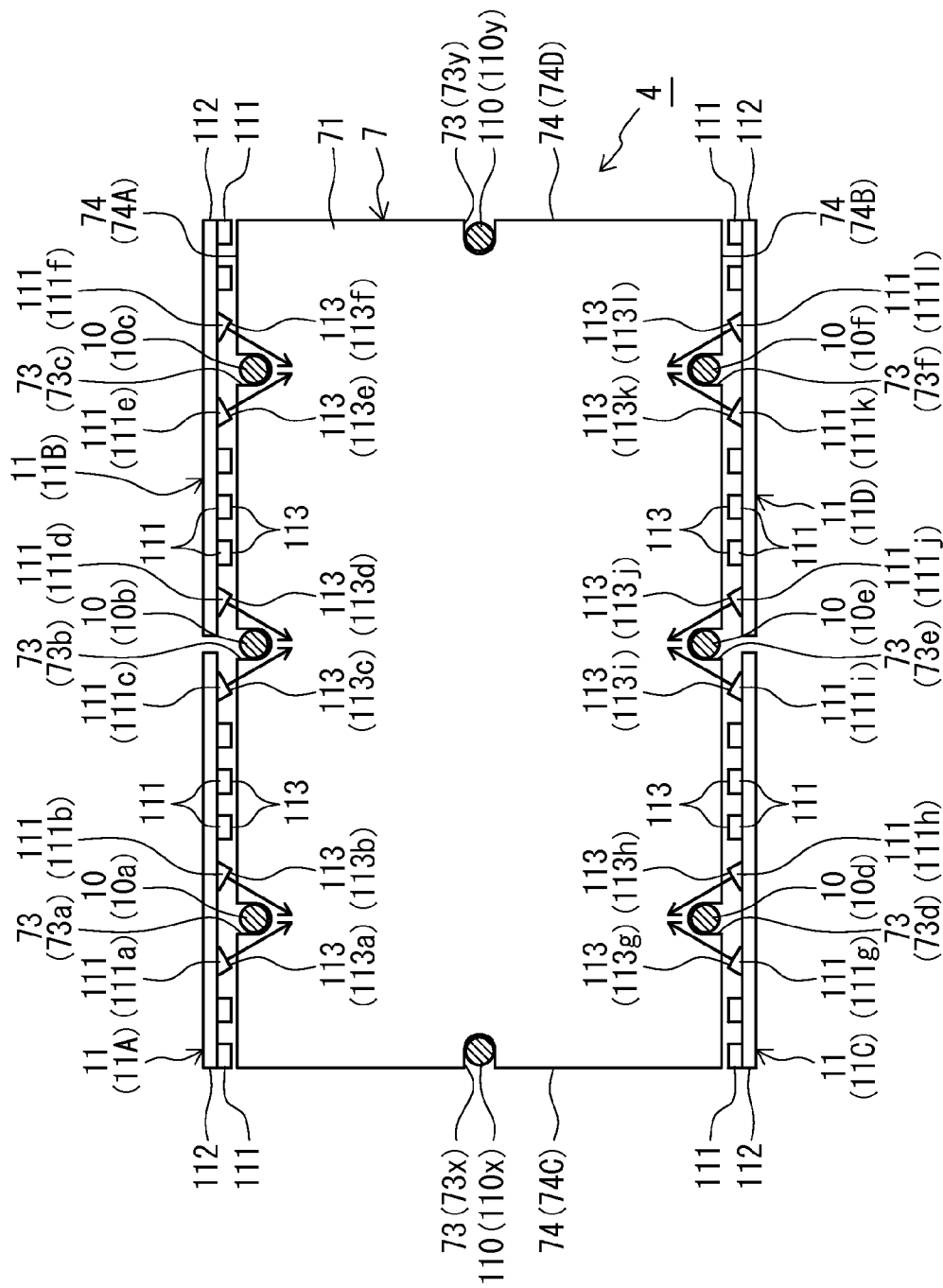
FIG. 2 is a plan view showing a schematic configuration of an edge light type planar light source device of the preferred embodiment of the present invention.

The light guide plate 7 defines a plate member made from a clear material such as an acrylic resin, which is about 3 to 4 mm in thickness. FIG. 2 is a plan view showing a schematic configuration of the edge light type planar light source device 4. Shown in FIG. 2 is the edge light type planar light source device 4 when seen in a plan view from the side of the front face 71 of the light guide plate 7. The optical sheets 6 are disposed on the front face 71 of the light guide plate 7 actually, which are not shown in FIG. 2 for the sake of illustration.

The light guide plate 7 has a rectangular shape, and includes the plurality of notches 73 disposed on a peripheral portion of the light guide plate 7 as shown in FIG. 2. The three notches 73$a$, 73$b$ and 73$c$ among the notches 73 are disposed on a peripheral portion of the light guide plate 7 that is inside of an end face 74 (74A) on one of longer sides of the light guide plate 7. In addition, other three notches 73$d$, 73$e$ and 73$f$ are disposed on a peripheral portion of the light guide plate 7 that is inside of an end face 74 (74B) on the other longer side of the light guide plate 7. A notch 73$x$ is disposed on a peripheral portion of the light guide plate 7 that is inside of an end face 74 (74C) on one of shorter sides of the light guide plate 7. In addition, a notch 73$y$ is disposed on a peripheral portion of the light guide plate 7 that is inside of an end face 74 (74D) on the other shorter side of the light guide plate 7. Each notch 73 has the shape of the letter "U" that is recessed from each end face 74 of the light guide plate 7 as shown in FIG. 2.

The light guide plate 7 includes a plurality of scattering members in a dot pattern (not shown) that are disposed on a back face 72 of the light guide plate 7. The scattering members are preferably provided thereon by dotting paint containing a white pigment on the back face 72 of the light guide plate 7 in a silkscreening printing method, or are preferably provided thereon by forming a plurality of concave portions (i.e., frosting) on the back face 72 of the light guide plate 7, which are formed by shaving the back face 72.

The locking pins 10 that have a column shape are each inserted in the notches 73 of the light guide plate 7. The locking pins 10 erect on the floor face (bottom) 91 of the chassis 9 as shown in FIG. 1, and are inserted in the notches 73 from the back face 72 toward the front face 71 of the light guide plate 7. The locking pins 10 are inserted also in the notches 81 of the reflection sheet 8 in addition to the notches 73 of the light guide plate 7 as shown in FIG. 1. Because the locking pins 10 are inserted in the notches 73, the light guide plate 7 can be disposed on the floor face 91 of the chassis 9. The locking pins 10 of the present embodiment are made from the same material as chassis 9. The bezel 2 having the frame shape and other constituent elements are disposed above the locking pins 10 as shown in FIG. 1. To be specific, the locking pins 10 are disposed in a nondisplay region of the liquid crystal display device (the liquid crystal display panel 3).

The optical sheets 6 are stacked on the front face 71 of the light guide plate 7 as shown in FIG. 1. The optical sheets 6 have a rectangular shape so as to cover the front face 71 of the light guide plate 7. The optical sheets 6 of the present embodiment consist of three layers of apolarization selective reflection layer, a lens layer and a diffusion layer. The diffusion layer is arranged to diffuse light emitted from the front face 71 of the light guide plate 7, and allows uniformalization of brightness distribution of the light. The lens layer is arranged to gather light that emits from the diffusion layer, and allows enhancement of front brightness of the light. The polarization selective reflection layer is arranged to selectively reflect the light that passes through the lens layer so that the light is not absorbed by a polarizing plate (not shown) that is attached on the back side of the liquid crystal display panel 3.

The reflection sheet 8, the light guide plate 7, and the optical sheets 6 are stacked in this order on the floor face 91 of the chassis 9 as shown in FIG. 1. The frame 5 having a frame shape is covered on the chassis 9 in order to fix the stack to the chassis 9.

The linear light source units 11 (11A, 11B, 11C and 11D) are disposed such that the light is projected onto the end faces 74 of the light guide plate 7 as shown in FIGS. 1 and 2. Each linear light source unit 11 has a configuration of including an LED substrate 112 having a long shape, and a plurality of LED elements 111 that are disposed on the LED substrate 112. The LED elements 111 are aligned on each LED substrate 112. Each of the LED elements 111 has a package structure such that an LED chip that emits blue light is encapsulated in a transparent resin into which a yellow fluorescent material is mixed, for example, and is capable of emitting white light from its front face (light emitting surface) 113. The light emitted from the light emitting surfaces 113 of the LED elements 111 enters the inside of the light guide plate 7 from the end faces 74.

Each LED substrate 112 includes a radiating plate preferably made from aluminum (not shown), and an insulating layer (not shown) that covers the radiating plate. The LED elements 111 disposed on each LED substrate 112 are connected to one another by wiring patterns (not shown). The LED elements 111 are connected in series. The wiring patterns are provided on each insulating layer. A light-source-side substrate connector (not shown) is disposed at one end of each LED substrate 112, and a ground-side substrate connector (not shown) is disposed at the other end of each LED substrate 112. The light-source-side substrate connector and the ground-side substrate connector are arranged to supply power to the LED elements 111. The light-source-side substrate connector includes a light-source-side terminal (positive terminal), and the ground-side substrate connector includes a ground-side terminal (negative terminal). The light-source-side substrate connector and the ground-side substrate connector are connected to a power board (not shown) of the edge light type planar light source device 4 via cables (not shown).

A thermal conductive sheet 114 is attached to each LED substrate 112 on a side where the LED elements 111 are not disposed as shown in FIG. 1. Fixing members 115 are provided such that the thermal conductive sheets 114 are sandwiched between the fixing members 115 and the LED substrates 112. The fixing members 115 are metal plates that take the shape of the letter "L" in cross section by bending the metal plates. The LED substrates 112 are fixed to some portions of the fixing members 115, where the fixing members 115 erect with the portions on the floor face 91 of the chassis 9, while sandwiching the thermal conductive sheets 114. The portions of the fixing members 115 with which the fixing members 115 erect on the floor face 91 are fixed to the chassis 9 with the use of screws 116.

The two linear light source units 11A and 11B are disposed side by side along the end face 74A on one of longer sides of the light guide plate 7 having a rectangular shape as shown in FIG. 2. A clearance, which is set considering thermal expansion of the light guide plate 7, is provided between the light emitting surfaces 113 of the LED elements 111 disposed on the linear light source units 11A and 11B and the end face 74A of the light guide plate 7. In addition, the two linear light source units 11C and 11D are disposed side by side along the end face 74B on the other longer side of the light guide plate 7. A clearance, which is set considering thermal expansion of the light guide plate 7, is provided between the light emitting surfaces 113 of the LED elements 111 disposed on the linear light source units 11C and 11D and the end face 74B of the light guide plate 7.

The three locking pins 10a, 10b and 10c are disposed on the peripheral portion of the light guide plate 7 that is inside of the end face 74A on the one of the longer sides of the light guide plate 7. In addition, the three locking pins 10d, 10e and 10f are disposed on the peripheral portion of the light guide plate 7 that is inside of the end face 74B on the other longer side of the light guide plate 7. The linear light source units 11A to 11D are disposed in front of the locking pins 10a to 10f. Some of the LED elements 111 are disposed in the vicinity of the locking members 10a to 10f, and the some LED elements 111 are disposed on the LED substrate 112 such that the light emitting surfaces 113 of the some LED elements 111 are inclined toward the end faces 74 of the light guide plate 7 to gather the light at the rear of the locking members 10a to 10f.

A detailed description of the LED elements 111a and 111b disposed in the vicinity of the locking members 10a will be provided. The LED element 111a is disposed on the LED substrate 112 of the linear light source unit 11A such that the light emitting surface 113a is inclined toward the end face 74A of the light guide plate 7 to make the light head to the rear of the locking member 10a. In addition, the LED element 111b, which is adjacent to the LED element 111a, is disposed on the LED substrate 112 of the linear light source unit 11A such that the light emitting surface 113b is inclined toward the end face 74A of the light guide plate 7 to make the light head to the rear of the locking member 10a. The light emitting surface 113a of the LED element 111a and the light emitting surface 113b of the LED element 111b are inclined toward the end face 74A of the light guide plate 7 in directions to approach (face) each other. When the light is emitted straight from the light emitting surfaces 113, the LED elements 111 of the present embodiment can emit the brightest light. Thus, when the light emitting surfaces 113 of the LED elements 111 are inclined as described above, the brightest light heads to the rear of the locking members 10, and is gathered at the rear of the locking members 10.

The light that gathers at the rear of the locking members 10 is schematically shown in FIG. 2, where the light is indicated with the arrows that head to the rear of the locking members 10 from the light emitting surfaces 113 of the LED elements 111. In the case of the locking member 10b, the light is gathered at the rear of the locking member 10b by the LED elements 111c and 111d that are adjacent to the locking member 10b as shown in FIG. 2. To be specific, the light emitted from the light emitting surface 113c of the LED element 111c and the light emitted from the light emitting surface 113d of the LED element 111d are gathered at the rear of the locking member 10b.

In a similar manner, in the case of the locking member 10c, the light is gathered at the rear of the locking member 10c by the LED elements 111e and 111f that are adjacent to the locking member 10c. To be specific, the light emitted from the light emitting surface 113e of the LED element 111e and the light emitted from the light emitting surface 113f of the LED element 111f are gathered at the rear of the locking member 10c. In the case of the locking member 10d, the light is gathered at the rear of the locking member 10d by the LED elements 111g and 111h that are adjacent to the locking member 10d. To be specific, the light emitted from the light emitting surface 113g of the LED element 111g and the light emitted from the light emitting surface 113h of the LED element 111h are gathered at the rear of the locking member 10d. In the case of the locking member 10e, the light is gathered at the rear of the locking member 10e by the LED elements 111i and 111j that are adjacent to the locking member 10e. To be specific, the light emitted from the light emitting surface 113i of the LED element 111i and the light emitted from the light emitting surface 113j of the LED element 111j are gathered at the rear of the locking member 10e. In the case of the locking member 10f, the light is gathered at the rear of the locking member 10f by the LED elements 111k and 111l that are adjacent to the locking member 10f. To be specific, the light emitted from the light emitting surface 113k of the LED element 111k and the light emitted from the light emitting surface 113l of the LED element 111l are gathered at the rear of the locking member 10f.

The other LED elements 111 are disposed apart from the locking members 10, and the other LED elements 111 are disposed on the LED substrate 112 of the light source units 11 such that the light emitting surfaces 113 of the other LED elements 111 face the end faces 74 of the light guide plate 7 in a parallel manner.

The locking pin 110 (110x) is inserted in the notch 73 (73x) that is disposed on the peripheral portion of the light guide plate 7 that is inside of the end face 74C on the one of shorter sides of the light guide plate 7. The locking pin 110 (110y) is inserted in the notch 73 (73y) that is disposed on the peripheral portion of the light guide plate 7 that is inside of the end face 74D on the other shorter side of the light guide plate 7. There is no portion that is lower in luminance around the locking pins 110x and 110y.

Thus, by inclining the light emitting surfaces 113 of the other LED elements 111 toward the end faces 74 of the light guide plate 74, the rear of the locking pins 10 can be made as bright as the other portions. Having the configuration described above, the edge light type planar light source device 4 of the present embodiment is capable of preventing luminance unevenness that is caused by the locking members 10.

Described above is the configuration that two LED elements 111 are used for one locking pin 10, and the orientations of the two LED elements 111 are adjusted to make the rear of the locking pin 10 bright. It is also preferable to use one LED element 111 for one locking pin 10 and adjust the orientation of the one LED element 111 to make the rear of the locking pin 10 bright, or to use three or more LED elements 111 for one locking pin 10 and adjust the orientations of the three or more LED elements 111 to make the rear of the locking pin 10 bright.

It is also preferable to use through holes that penetrate the periphery portion of the light guide plate 7 instead of the notches 73. Conventional through holes for disposition that are provided on a periphery portion of a light guide plate are used for the through holes.

Figure 3:
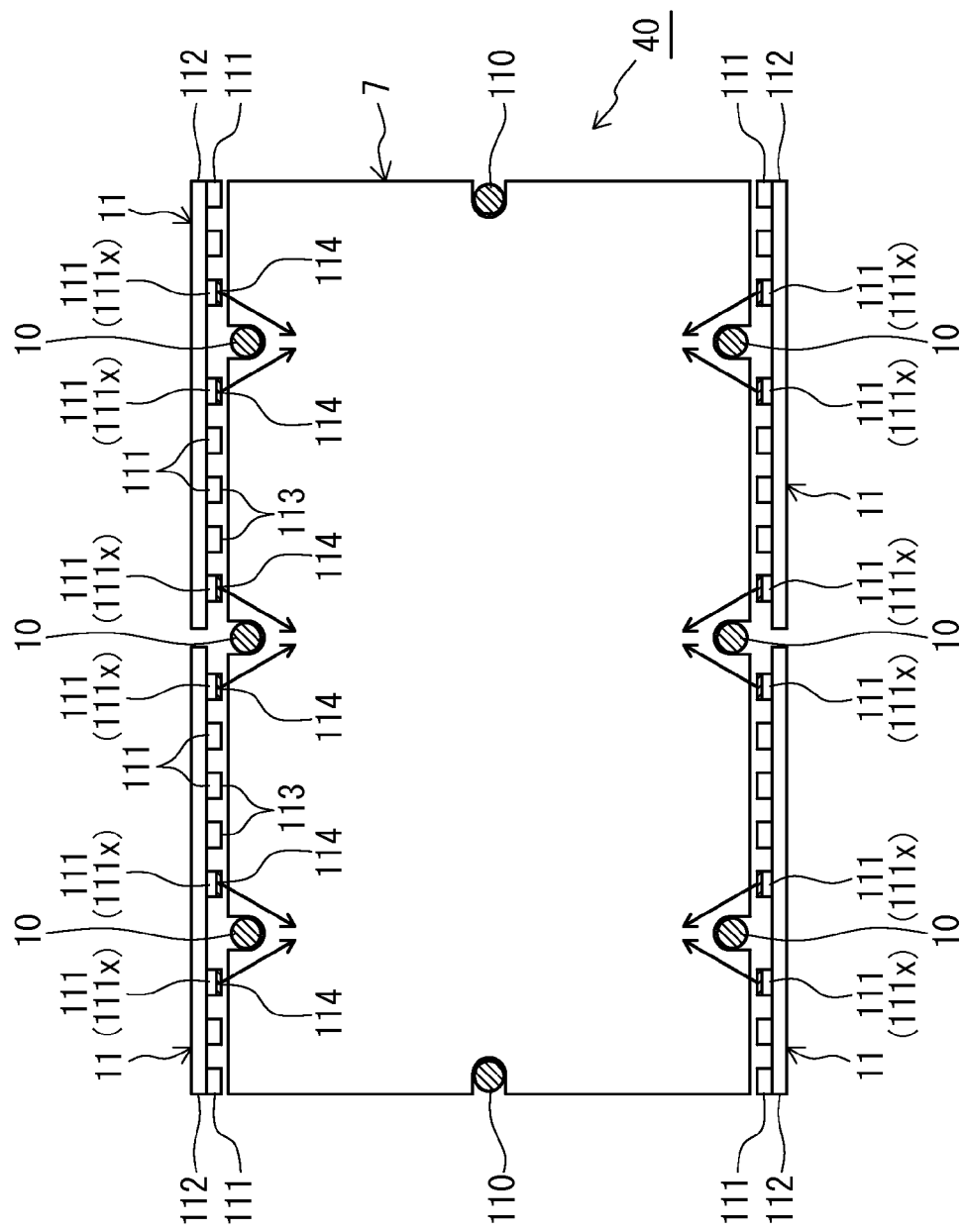
FIG. 3 is a plan view showing a schematic configuration of an edge light type planar light source device of another preferred embodiment of the present invention.
Figure 4:
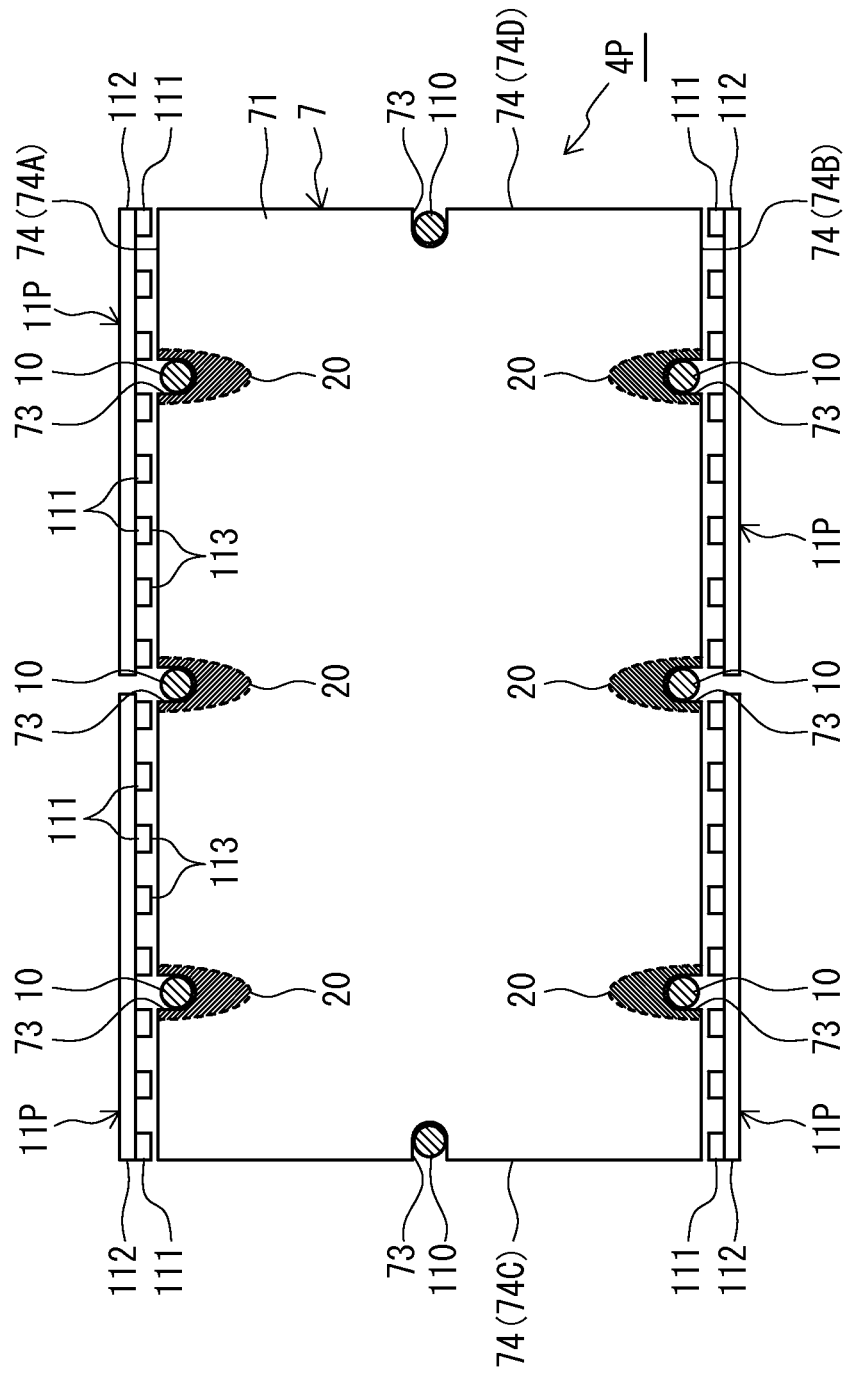
FIG. 4 is a plan view showing a schematic configuration of a conventional edge light type planar light source device.

A detailed description of an edge light type planar light source device of another preferred embodiment of the present invention will be provided with reference to FIG. 3. FIG. 3 is a plan view showing a schematic configuration of an edge light type planar light source device 40 of the another preferred embodiment. The edge light type planar light source device 40 has a configuration same as the light source device 4 shown in FIG. 2, except for including LED elements 111x disposed in the vicinity of the locking pins 10. The edge light type planar light source device 40 has a configuration that the LED elements 111x disposed in the vicinity of the locking pins 10 have their directivities adjusted so as to be wider than the other LED elements 111. To be specific, the LED elements 111x include resin lenses arranged to widen (weaken) the directivities, which are disposed on top faces of the LED elements 111x. With this configuration, the LED elements 111x have their irradiation ranges set to be wider than the other the LED elements 111. Thus, widening the directivities (irradiation ranges) of the LED elements 111x allows the LED elements 111x to emit light that goes around to the rear of the locking pins 10 from light emitting surfaces of the LED elements 111x as indicated with the arrows shown in FIG. 3. As described above, it is also preferable to adjust the directivities of the LED elements 111x disposed in the vicinity of the locking pins 10 to prevent luminance unevenness that is caused by the locking members 10.

The invention claimed is:

1. An edge light type planar light source device comprising:
    a light guide plate arranged to emit light, which enters from an end face of the light guide plate, from a front face of the light guide plate;
    a linear light source unit that comprises:
    a plurality of LED elements each comprising light emitting surfaces from which light is emitted; and
    an LED substrate on which the LED elements are aligned, the light emitting surfaces being opposed to the end face of the light guide plate;
a floor face, on which the light guide plate is disposed; and
    a locking member erecting on the floor face, that is inserted in a peripheral portion of the light guide plate from a back face of the light guide plate toward the front face of the light guide plate,
    wherein some of the LED elements are disposed in a vicinity of the locking member, and the some LED elements are disposed on the LED substrate such that the light emitting surfaces of the some LED elements are inclined toward the end face of the light guide plate to gather the light at the rear of the locking member.

2. The edge light type planar light source device according to claim 1,
    wherein at least two of the LED elements are disposed in the vicinity of the locking member, and the at least two LED elements are disposed on the LED substrate such that the light emitting surfaces of the at least two LED elements approach each other and are inclined toward the end face of the light guide plate.

3. The edge light type planar light source device according to claim 1,
    wherein the light guide plate comprises either one of a notch and a through hole that is disposed on the peripheral portion of the light guide plate, and the locking member is inserted in the either one of the notch and the through hole.

4. A liquid crystal display device comprising:
    a transmissive or transflective liquid crystal display panel; and
    the edge light type planar light source device according to claim 1, which is disposed on a back face of the liquid crystal display panel.

5. An edge light type planar light source device comprising:
    a light guide plate arranged to emit light, which enters from an end face of the light guide plate, from a front face of the light guide plate;
    a linear light source unit that comprises:
    a plurality of LED elements each comprising light emitting surfaces from which light is emitted; and
    an LED substrate on which the LED elements are aligned, the light emitting surfaces being opposed to the end face of the light guide plate;
a floor face, on which the light guide plate is disposed; and
    a locking member erecting on the floor face, that is inserted in a peripheral portion of the light guide plate from a back face of the light guide plate toward the front face of the light guide plate,
    wherein some of the LED elements are disposed in a vicinity of the locking member, and the some LED elements each comprise resin lenses arranged to make directivities of the some LED elements wider than directivities of the other LED elements to gather the light at the rear of the locking member.

* * * * *